(12) United States Patent
Pulice et al.

(10) Patent No.: US 8,714,419 B2
(45) Date of Patent: May 6, 2014

(54) SPARE TIRE ANTI-THEFT SECURITY DEVICE

(75) Inventors: Peter Pulice, Darien, IL (US); Eric Kowalik, Chicago, IL (US)

(73) Assignee: Spare-tite, Inc., Darien, IL (US)

( * ) Notice: Subject to any disclaimer, the term of this patent is extended or adjusted under 35 U.S.C. 154(b) by 491 days.

(21) Appl. No.: 12/981,264

(22) Filed: Dec. 29, 2010

(65) Prior Publication Data

US 2011/0155773 A1    Jun. 30, 2011

Related U.S. Application Data

(60) Provisional application No. 61/290,756, filed on Dec. 29, 2009.

(51) Int. Cl.
*B62D 43/00* (2006.01)
*B62D 43/04* (2006.01)

(52) U.S. Cl.
USPC ..................... 224/42.23; 224/42.12

(58) Field of Classification Search
USPC ............................ 224/42.23, 42.12
IPC ....................................... B62D 43/04
See application file for complete search history.

(56) References Cited

U.S. PATENT DOCUMENTS

| | | | |
|---|---|---|---|
| 3,542,413 A * | 11/1970 | Hardison | ...................... 294/86.4 |
| 3,824,815 A | 7/1974 | Darling | |
| 4,042,158 A * | 8/1977 | Cole | ........................... 224/42.23 |
| 4,076,158 A | 2/1978 | Barr | |
| 4,111,344 A | 9/1978 | MacDonald | |
| 4,161,267 A | 7/1979 | Morrison | |
| 4,225,066 A | 9/1980 | Barr | |
| 4,282,995 A | 8/1981 | Austin | |
| 4,294,088 A | 10/1981 | Barr | |
| 4,308,733 A | 1/1982 | Tampa | |
| 4,548,540 A | 10/1985 | Renfro | |
| 4,751,833 A | 6/1988 | Stumpf, Jr. | |
| 4,768,361 A | 9/1988 | Derman | |
| 4,873,851 A | 10/1989 | Arnett | |
| 4,878,366 A | 11/1989 | Cox | |
| 4,884,785 A * | 12/1989 | Denman et al. | ................ 254/389 |
| 4,932,575 A | 6/1990 | Ware | |
| 4,988,023 A | 1/1991 | Heathcoat | |
| 5,077,995 A | 1/1992 | Appelbaum | |
| 5,199,287 A | 4/1993 | McClary | |
| 5,303,569 A | 4/1994 | Wright | |
| 5,330,313 A * | 7/1994 | Easterwood | ................... 414/463 |
| 5,343,722 A | 9/1994 | Richardson | |
| D351,986 S | 11/1994 | Schotthoefer | |

(Continued)

FOREIGN PATENT DOCUMENTS

| | | |
|---|---|---|
| FR | 2806056 | 9/2001 |
| GB | 2365395 | 2/2002 |

*Primary Examiner* — Brian D Nash
*Assistant Examiner* — Derek Battisti
(74) *Attorney, Agent, or Firm* — Banner & Witcoff, Ltd.

(57) ABSTRACT

A novel and improved automobile spare tire securement and anti-theft system having a cable a yoke and a sheath covering the cable from the underside surface of the automobile to the yoke. The sheath provided in several example embodiments, including a unitary piece, separate pieces, adjustable height, and combinations of the same. The current invention overcomes the disadvantages of the prior art and accomplishes the surprising result of effective anti-theft protection, ease of access to the tire, reliable access to the tire, in an uncomplicated and cost effective manner.

6 Claims, 11 Drawing Sheets

(56) References Cited

U.S. PATENT DOCUMENTS

| | | |
|---|---|---|
| 5,475,995 A | 12/1995 | Livingston |
| 5,477,711 A | 12/1995 | Oliveri |
| 5,487,288 A | 1/1996 | Frantz |
| 5,582,048 A | 12/1996 | Schotthoefer |
| 5,638,710 A | 6/1997 | Howard, Jr. et al. |
| 5,638,711 A | 6/1997 | Schotthoefer |
| 5,718,411 A | 2/1998 | Baughan et al. |
| D395,221 S | 6/1998 | Ryan et al. |
| 5,758,523 A | 6/1998 | Kozlowski, Jr. et al. |
| 5,791,171 A | 8/1998 | Kelley |
| 5,802,895 A | 9/1998 | Osgood |
| 5,836,182 A | 11/1998 | Schotthoefer |
| 5,924,314 A | 7/1999 | Cernansky |
| 5,943,887 A | 8/1999 | Kozlowski, Jr. et al. |
| 5,954,246 A | 9/1999 | Golovoy et al. |
| D421,707 S | 3/2000 | Gregory |
| 6,092,790 A | 7/2000 | Dobmeier et al. |
| 6,142,449 A | 11/2000 | Aldridge |
| 6,164,100 A | 12/2000 | Schotthoefer |
| 6,213,361 B1 | 4/2001 | Dexel |
| 6,360,571 B1 | 3/2002 | O'Neal |
| 6,370,927 B1 | 4/2002 | Gonzalez et al. |
| 6,390,760 B1 | 5/2002 | Affer et al. |
| 6,427,885 B1 | 8/2002 | Dexel |
| 6,435,479 B1 * | 8/2002 | Raz et al. .................... 254/323 |
| 6,499,724 B1 | 12/2002 | Dobmeier |
| 6,505,488 B1 | 1/2003 | Princell |
| 6,527,252 B2 * | 3/2003 | Dziedzic .................... 254/323 |
| 6,554,253 B1 | 4/2003 | Dobmeier |
| 6,561,489 B1 | 5/2003 | Wakefield |
| 6,749,094 B1 | 6/2004 | Dexel |
| 6,871,841 B2 * | 3/2005 | Brestelli et al. ............. 254/323 |
| 7,195,231 B2 | 3/2007 | Murphy |
| 7,413,171 B2 | 8/2008 | Reznar |
| 7,487,952 B2 | 2/2009 | Murphy |
| 7,487,953 B2 | 2/2009 | Sauner |
| 2002/0040979 A1 * | 4/2002 | Raz et al. .................... 254/323 |
| 2004/0265102 A1 | 12/2004 | Reznar |
| 2006/0013679 A1 | 1/2006 | Posani |
| 2006/0045689 A1 | 3/2006 | Voegeli |
| 2009/0194630 A1 * | 8/2009 | Thiyagarajan ............. 242/405.1 |
| 2010/0186467 A1 * | 7/2010 | Reidl et al. .................... 70/259 |

* cited by examiner

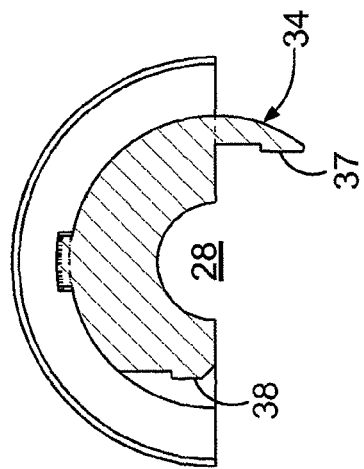
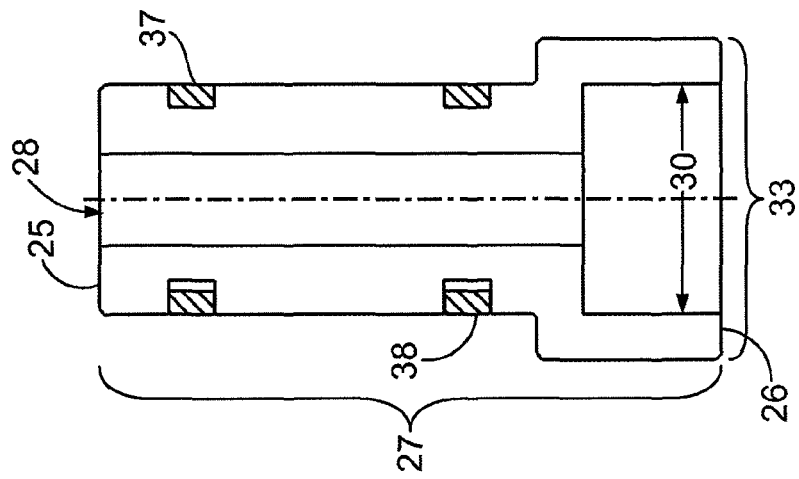
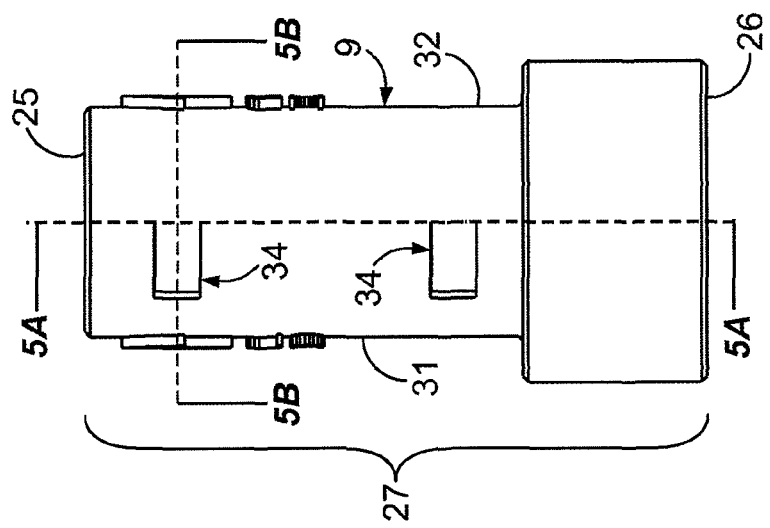

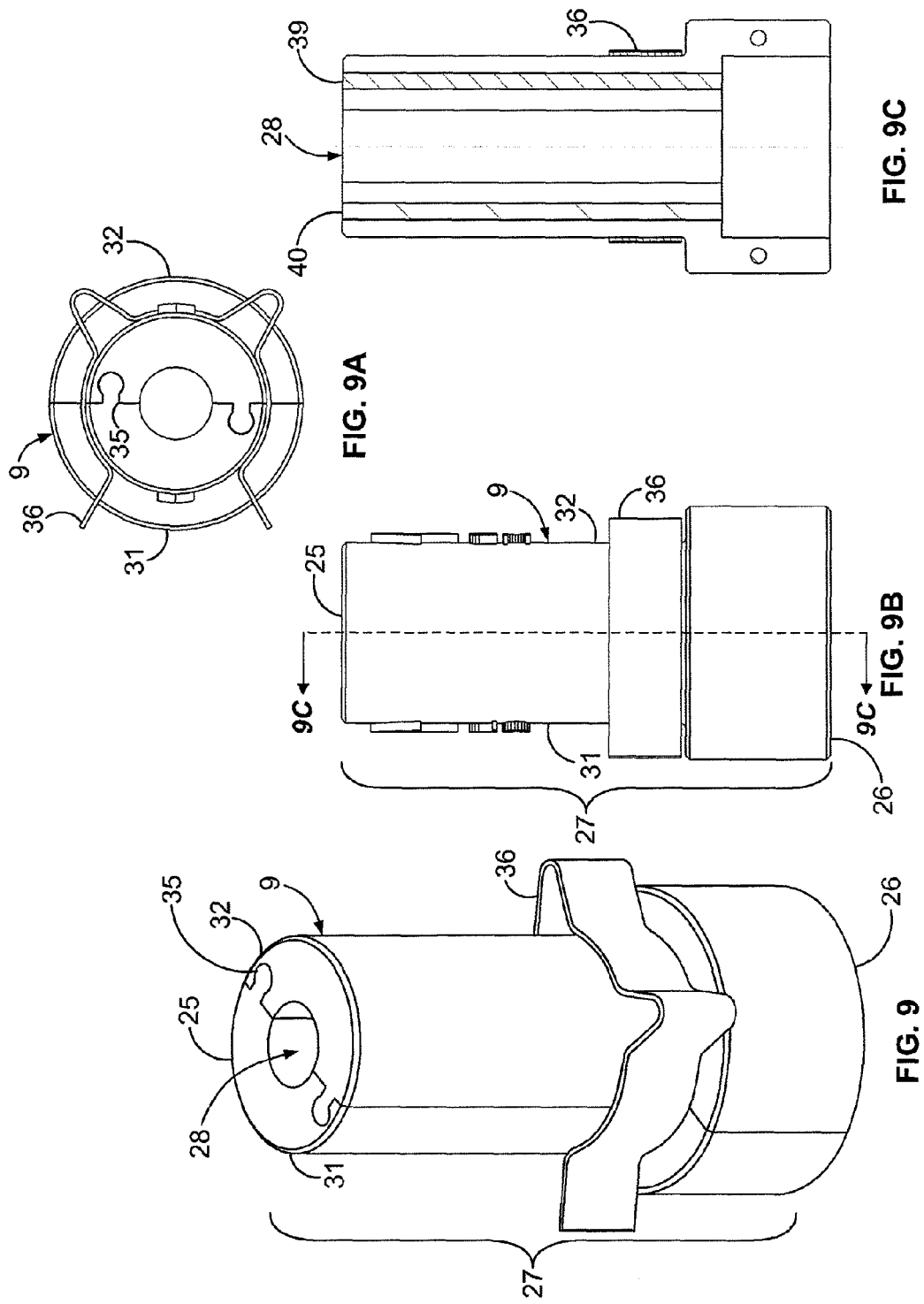

SPARE TIRE ANTI-THEFT SECURITY DEVICE

RELATED APPLICATION

This application claims the benefit of U.S. Provisional Application Ser. No. 61/290,756 filed on Dec. 29, 2009, which is incorporated by reference in its entirety.

FIELD OF THE INVENTION

The present invention relates generally to systems and methods for preventing theft of an automobile spare tire. More particularly, the invention relates to preventing theft of spare tires which are secured to the undercarriage of automobiles by a retractable cable and yoke system.

BACKGROUND OF THE INVENTION

There are numerous examples of spare tire anti-theft systems in the prior art. Many of these systems utilize a wide range of devices to prevent the spare from being removed from the car by would-be thieves. Despite the use and availability of such systems, spare tire theft persists and, by many accounts, has increased.

Systems which secure spare tires with a cable and yoke apparatus are particularly susceptible to theft. Such systems often secure the tire to the underside of the automobile carriage using a winch, cable, and yoke. When the tire is secured, the cable is often accessible through opening in the rim of the tire. Thieves can insert cable cutters through the rim and sever the exposed portion of the cable, which thereby simultaneously separates the tire from the system and damages the system. Often times, the entire securement apparatus needs to be replaced (winch, cable, and yoke). The vehicle owner typically incurs the cost of obtaining a new rim, tire, securement system, and labor associated with installation of each. Detrimentally, the owner typically does not notice the theft until the spare tire is needed in an emergency. In which case, the owner typically incurs the added cost of emergency service providers, such as towing.

Known systems and methods for preventing theft of spare tires secured by a cable and yoke apparatus lack in effectiveness, practicality, or both. For example, one inadequate solution is to chain the tire with a pad lock or combination lock to the underside of the carriage. Such a system is still susceptible to being breached by chain cutters. In addition, the locks are easily compromised by weather and other elements. Moisture, salt, and dirt can seize locks and bolts leaving the motorist unable to remove the spare tire during an emergency. Further, even if the lock is not compromised by the whether, the added inconvenience to the motorist for having to position themselves under the car to open the lock in darkness or inclement weather is undesirably significant.

An example of a prior art attempt in this field is given in U.S. Pat. No. 7,195,231 which discloses a spare tire security system having a plate or disk which is attached to the rim of the spare tire. While providing some protection for the cable and yoke by impeding access to the cable through the rim, such protection is inadequate as would-be thieves can simply unscrew the bolts and remove the plate. Another disadvantage is that this system does not cover the cable (which is the most vulnerable component of the cable and yoke system) and, therefore, does not prevent access to the cable from other openings, such as an opening between the spare tire and the underside surface of the vehicle. Also, the bolts and nuts are susceptible to the elements and can, for example, rust and thereby make it difficult for the vehicle operator to remove the plate when the spare is needed. Further, this system is inconvenient for the vehicle operator as in order to release the spare from the system and use the spare, the operator must spend time and effort to unscrew the bolts to remove the plate. Such additional time and effort is particularly detrimental in circumstances where the operator needs the spare in inclement weather or road-side.

One purpose of the invention is to provide an effective spare tire anti-theft system. Another purpose of the invention to provide a spare tire security device that offers both effective anti-theft protection and ease of access to the tire. Another purpose of the invention is to provide effective spare tire anti-theft protection, ease of access to the tire, and reliable access to the tire. Another purpose of the invention is to provide effective spare tire anti-theft protection, ease of access to the tire, reliable access to the tire, in an uncomplicated and cost effective manner.

BRIEF DESCRIPTION OF THE DRAWINGS

The detailed description of example embodiments of the invention will be made with reference to the accompanying drawings, wherein like designate corresponding parts in the several figures.

FIG. 5 depicts a side elevation view of an embodiment of the spare tire security device of the current invention.

FIG. 5A depicts a cross-sectional side elevation view taken along line 5A in FIG. 5.

FIG. 5B depicts a cross-sectional top view taken along line 5B in FIG. 5.

FIG. 9 depicts a top perspective view of an embodiment of the spare tire security device of the current invention.

FIG. 9A depicts a top view of the embodiment of the spare tire security device of the current invention shown in FIG. 9.

FIG. 9B depicts a side elevation view of the embodiment of the spare tire security device of the current invention shown in FIG. 9.

FIG. 9C depicts a cross-sectional side view taken along line 9C in FIG. 9B.

DETAILED DESCRIPTION

Figure 1:
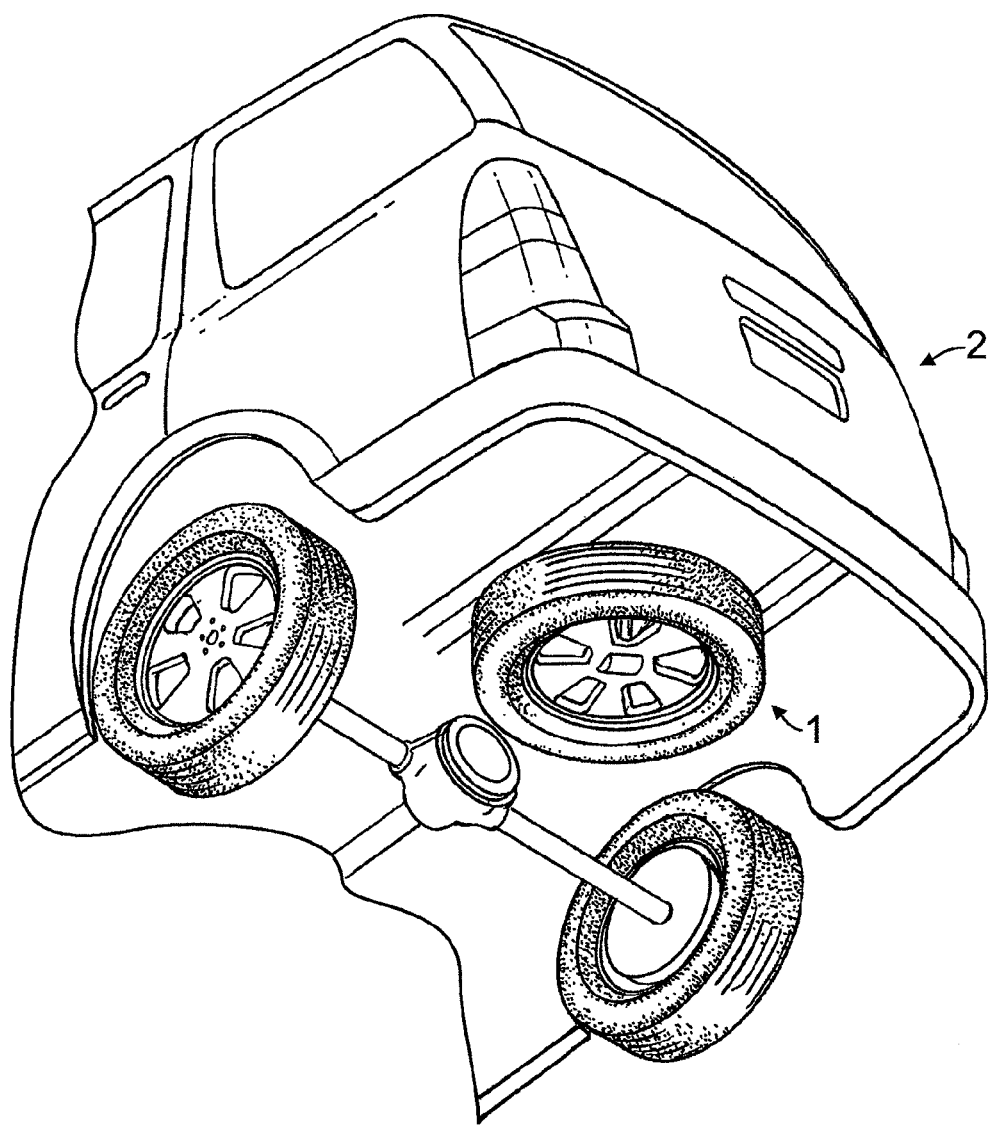
FIG. 1 depicts a bottom perspective view of the underside of an vehicle for which a cable and yoke system is used to secure a spare tire.

Referring to FIG. 1, a spare tire anti-theft device and anti-theft method according to the present invention is suitable for use to prevent theft of a spare tire secured by a cable and yolk system. Such cable and yolk systems are often utilized to secure a spare tire 1 to the underside of an automobile 2.

Figure 2:
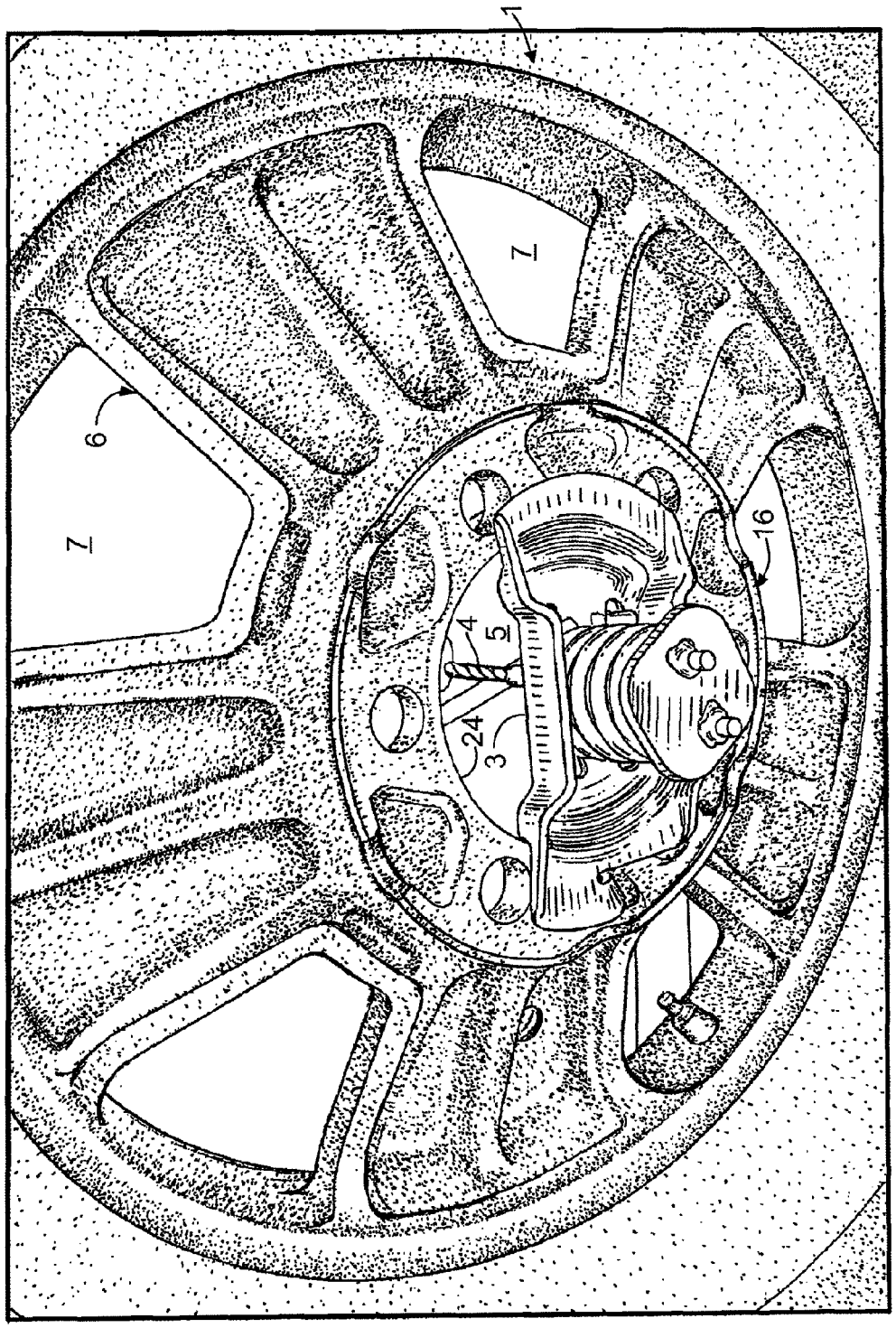
FIG. 2 depicts a bottom perspective view of a spare tire secured to the undercarriage of an automobile with a cable and yoke system.
Figure 3:
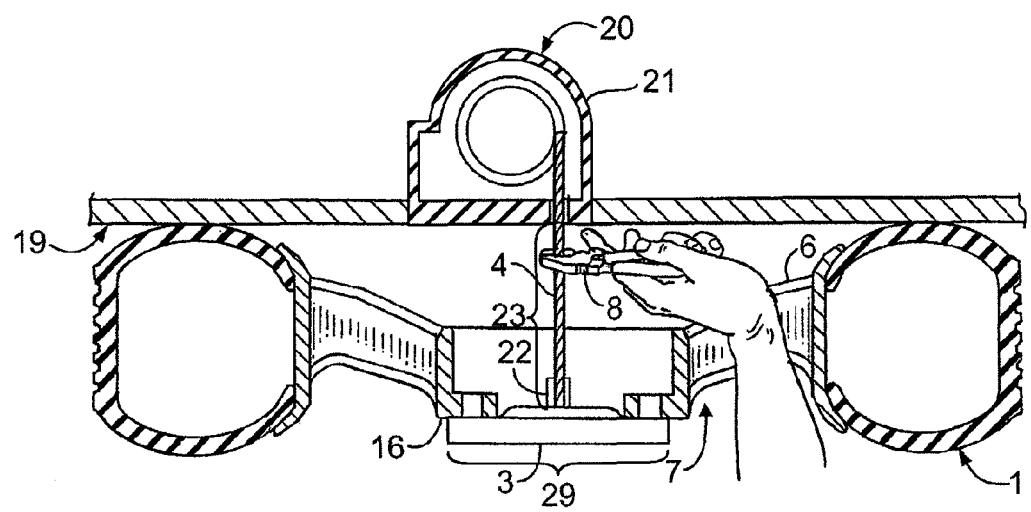
FIG. 3 depicts a cross-sectional side elevation view of a spare tire secured to the undercarriage of an automobile with a cable and yoke system and further includes a depiction of how a would-be thief can gain access to the cable through the rim of the spare tire to sever the exposed portion of the cable with cutters.
Figure 4:
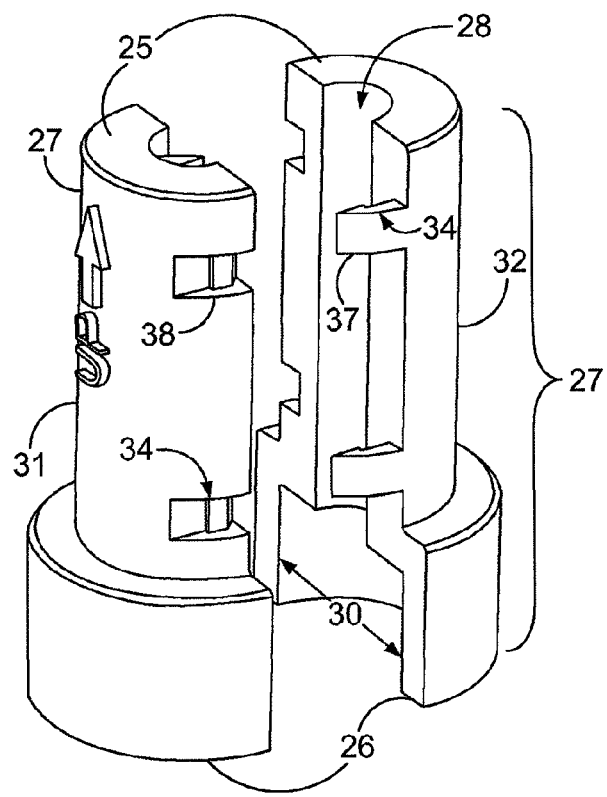
FIG. 4 depicts a top perspective view of an embodiment of the spare tire security device of the current invention.

Referring to FIGS. 2 and 3, the spare tire 1 is secured to the underside surface 19 of an vehicle with a cable and yolk system. The major components of such systems include a winch system 20, a cable 4, and a yoke 3. Various types of winch systems are known in the art for extending or retracting the cable 4. The winch 20 can be secured to the undercarriage of the automobile and can be considered part of the undercarriage and form at least part of the underside surface 19 of the automobile. FIG. 3 shows the winch housing 20 forming part of the underside surface 19 of the automobile. The proximal end of the cable 4 is secured to the automobile at, for example, the winch 20. The yoke 3 is attached to the distal end of the cable 4. The distal end of the cable 4 often includes some type of cover or cap 22 to facilitate connecting the cable 4 to the yoke 3 and prevent the cable from fraying. For purposes of this disclosure, the cover or cap 22 should be considered part of the cable. A coupling system is often used to connect the cable 4 to the yoke 3. The coupling can utilize the aforementioned cover or cap and be part of the distal end of the cable, part of the yoke, or both. A variety of coupling structures and methods are used to connect the cable 4 to the yoke 3, including various clamps, crimping devices, locks, fittings, screws, bolts, and more.

To secure a spare tire to the underside surface 19 using a cable and yoke system, the cable is first drawn from the winch to extend the length of uncoiled cable and provide slack. Next, the yoke is inserted through the hub 16 of the rim of the spare tire and positioned against the back side of the hub. The yoke and spare tire is drawn toward the underside of the automobile by, for example, cranking or winding the winch to draw the cable into the winch. The spare tire is secured against the underside surface 19 of the automobile by the tire or rim coming in contact with a portion of the underside surface 19 and the winch system holding the position of the cable taught to maintain such contact. Some systems use a chain in place of a cable 4 to perform the same function as a cable.

Cable and yolk systems typically permit access to the cable 4 through multiple openings while the spare tire is secured to the underside of the automobile. For example, space between the yoke 3 and inside diameter of the hub 16 of the rim 6 creates an opening 5 through which the cable 4 can be reached. In addition, spaces between spokes of the rim 6 can provide openings 7 through which the cable 4 can be reached. Other openings through which the cable can be reached can be created by the various sizes and shapes of tires, rims, and the undercarriage, and the manner and orientation in which the tires and rims are secured to the undercarriage. For example, any space between the tire and the underside surface of the automobile can create such an opening.

Referring to FIG. 3, a thief can reach the cable 4 with cutting device 8 through, for example, an opening 7 and use the cutting device 8 to sever the cable 4 and thereby release the spare tire 1 from the undercarriage. A thief can also reach the cable 4 with a cutting device through the opening 5 created by the space between the yoke 3 and the inside 24 of the hub 16 of the rim 6. The length of cable susceptible to being severed as described above typically includes any portion of the cable that extends between the underside surface of the automobile and the yoke. Such a portion of the cable can be referred to as the exposed cable. An example of a length of exposed cable is identified with reference number 23 in FIG. 3. The cutting device 8 can include any cutting device generally used in the art to cut the size of cable, chains, and like sized metal components typically used in cable and yoke systems. However, in most circumstances, thieves are limited to cutting devices that can fit easily and quickly in the tight spaces above the rim and the space below underside of the automobile and the road, such devices often include compact jaws and handles. The smaller cutting devices are also preferred by thieves as being more easily concealable than their larger counterparts. The smaller cutting devices, however, reduce the thieves' capability of cutting through larger diameter pieces and harder pieces.

Figure 6:
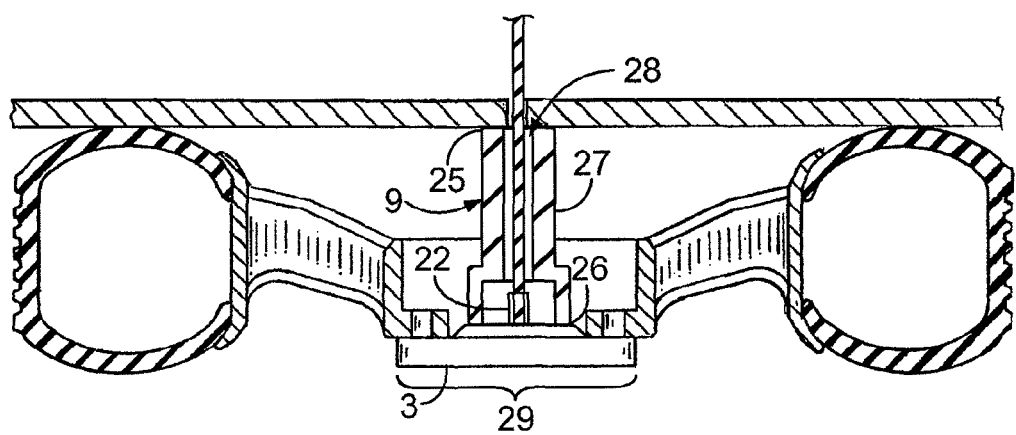
FIG. 6 depicts a cross-sectional side elevation view of a spare tire secured to the undercarriage of an automobile with a cable and yoke system and includes an embodiment of the spare tire security device of the current invention installed thereon.
Figure 7:
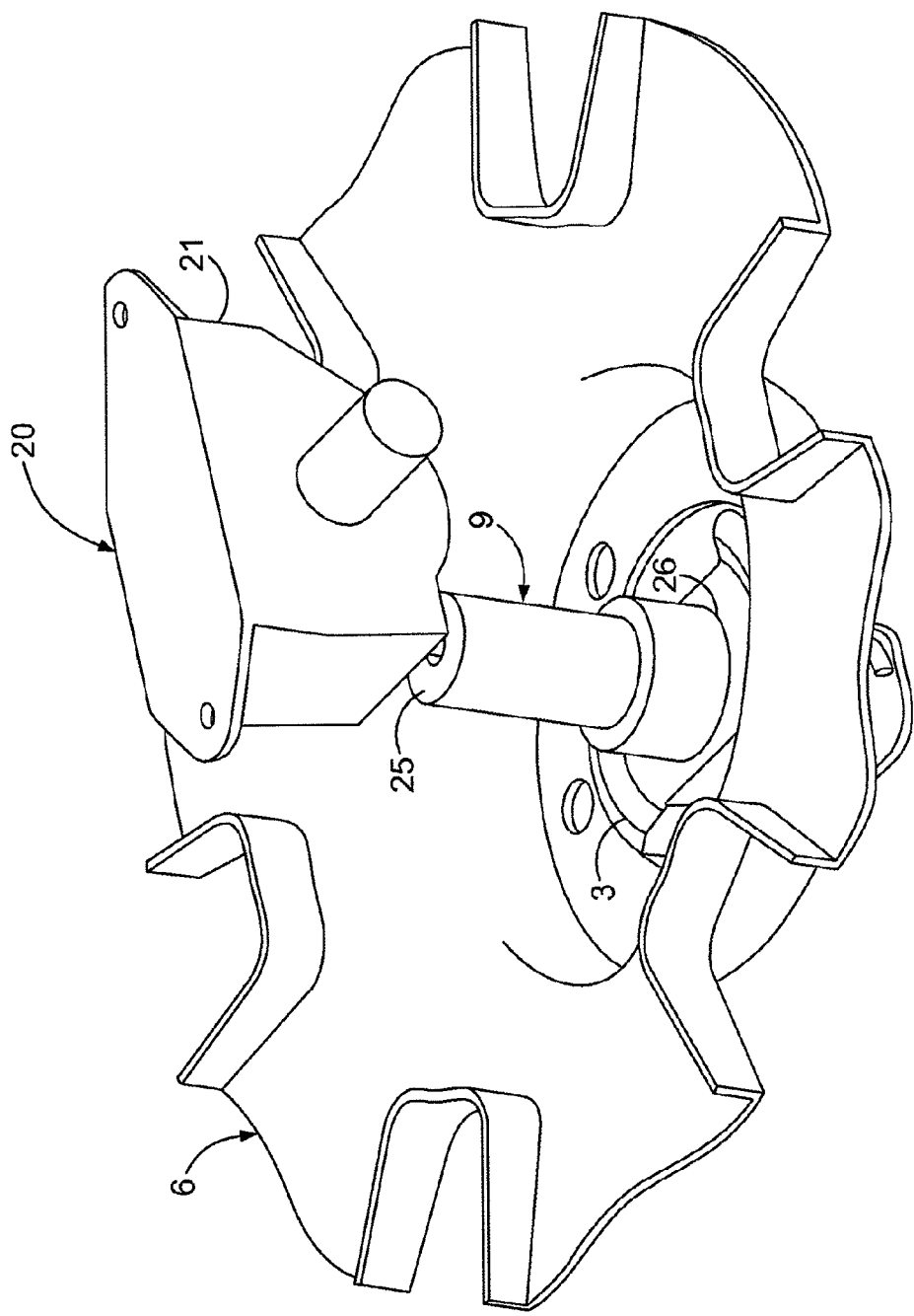
FIG. 7 depicts a top perspective view of a cable and yoke system and includes an embodiment of the spare tire security device of the current invention installed thereon.
Figure 8:
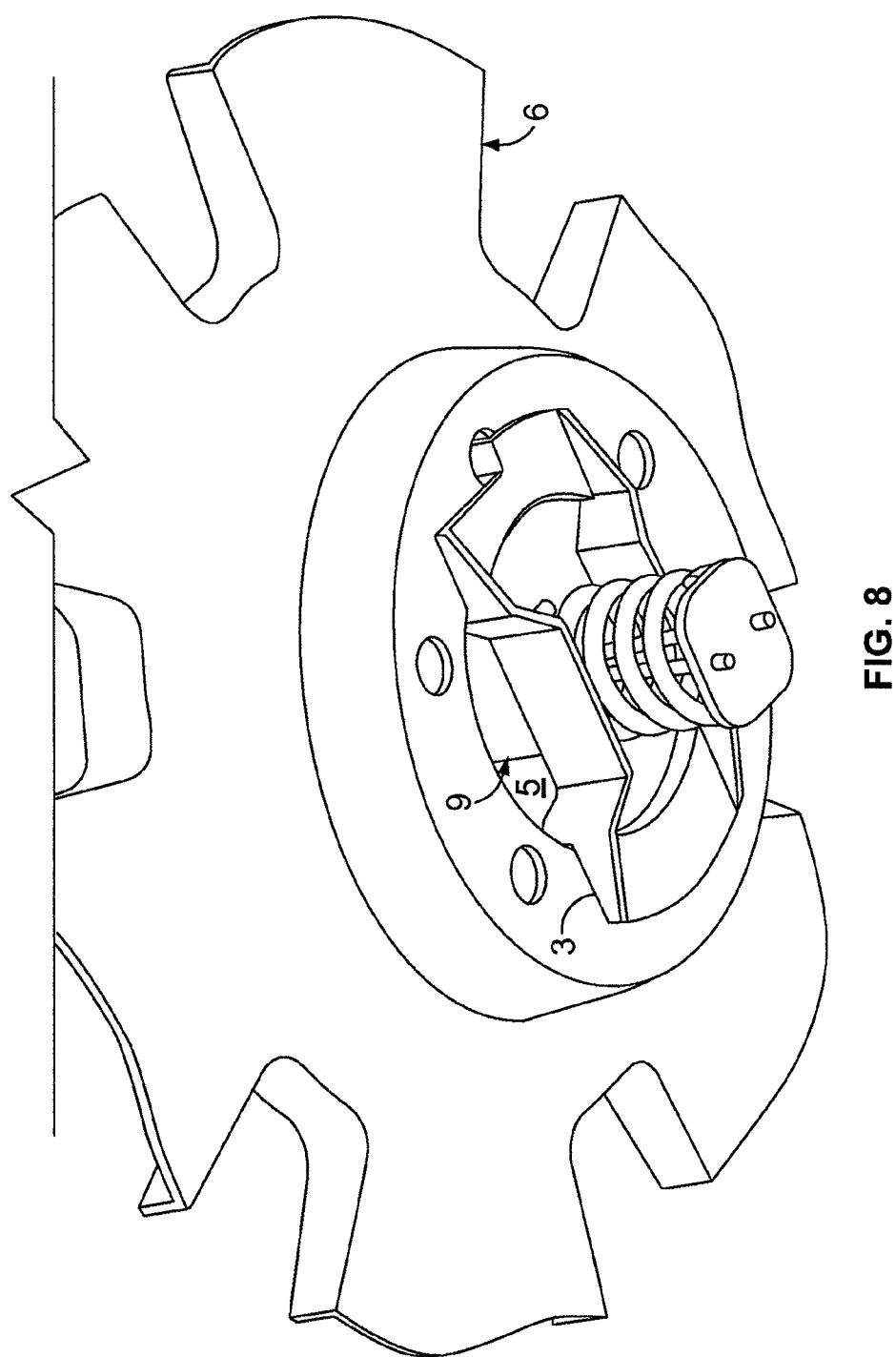
FIG. 8 depicts a bottom perspective view of a cable and yoke system and includes an embodiment of the spare tire security device of the current invention installed thereon.
Figure 11:
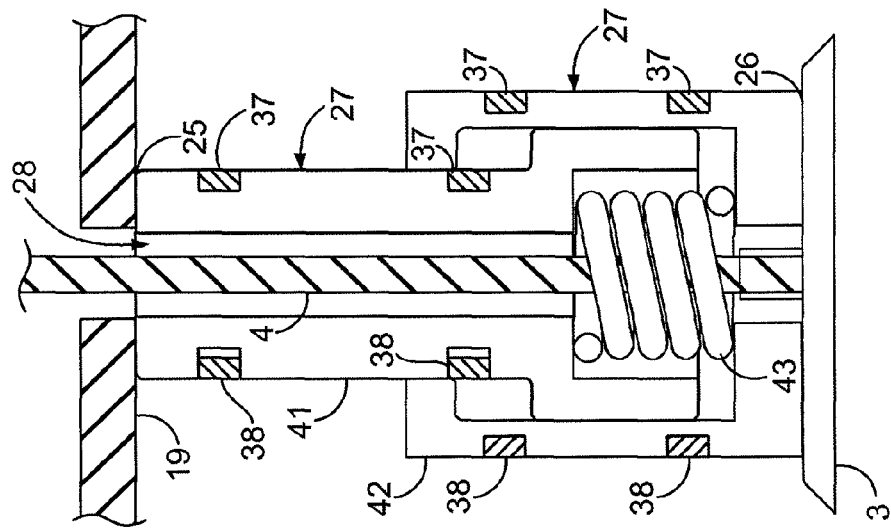
FIG. 11 depicts a cross-sectional side elevation view of an embodiment of the spare tire security device of the current invention shown in FIG. 10.
Figure 10:
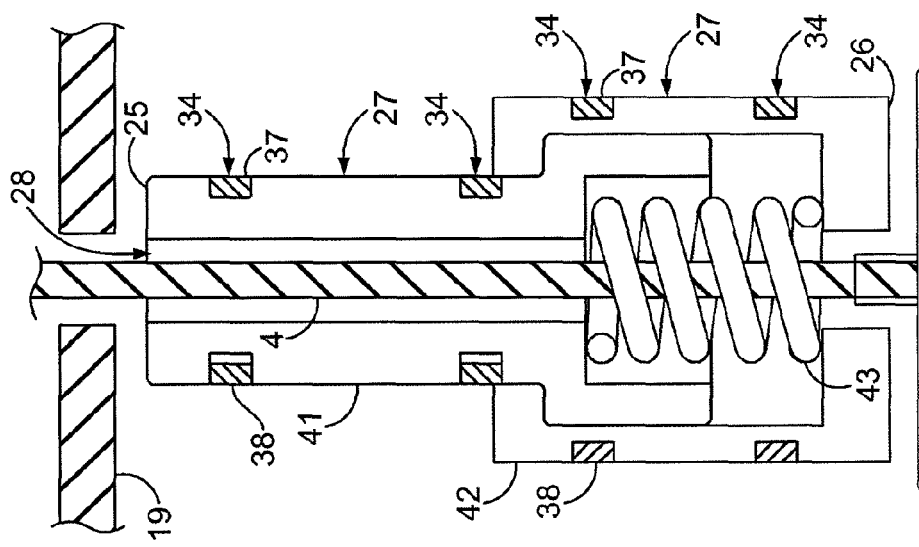
FIG. 10 depicts a cross-sectional side elevation view of an embodiment of the spare tire security device of the current invention.

Referring to FIGS. 4, 5, 5A, and 5B an example embodiment of the spare tire security device of the current invention comprises a sheath 9 including a top surface 25, a base surface 26, and a body 27 extending from the top surface to the base surface. The body includes a channel 28 defined therein. The channel 28 extends from and through the top surface 25 to and through the base surface 26. The channel 28 thereby forms a continuous, open passage through the body 27 of the sheath 9 through which the exposed cable 4 can extend or retract and be covered by the body of the sheath 9. As shown in FIG. 6, for example, the sheath covers the space proximate to the lateral circumference of the cable between the underside surface of the vehicle and the yoke. Referring to FIG. 7, the sheath 9 is depicted covering the lateral circumference of the cable.

The body of the sheath 27, and therefore the sheath 9, can be annular in shape, thereby providing the channel 28 a generally circular shape and inner diameter. The inner diameter should be greater than the diameter of the cable and can, for example, be about equal to width of the yoke or less than the width the yoke. The width of the yoke as used herein is the lateral dimension transverse to the lateral length 29 of the yoke 3. The lateral length of the yoke is measured from between the edges of the lateral portions of the yoke 3 that contact the hub 16. The lateral dimension between the portions of the yoke that do not contact the hub 16 can include the shortest lateral dimension of the yoke. The shortest portion of the width of a standard yoke is about 2.25 inches. Accordingly, in one example embodiment, the inner diameter of the channel proximate to the base surface 30 is about equal to the shortest lateral dimension of the yoke or less than the shortest lateral dimension of the yoke, which may be, for example, about 2.25 inches. Similarly, the outer diameter of the body proximate to the base surface 33 is at least about equal to the shortest lateral dimension of the yoke or less than the shortest lateral dimension of the yoke. In one example embodiment, the width of the yoke is about 2.25 inches, and the outer diameter of the body proximate to the base can be about 2.25 inches, such as 2.0 inches, or less and the inner diameter can be slightly greater than that of the cable, such as 0.25 inches. In one example embodiment the inner diameter of the channel proximate to the base surface is about 1.50 inches, the inner diameter of the channel distal to the base surface is about 0.50 inches, the outer diameter of the body proximate to the base surface is about 1.75 inches, and the outer diameter of the body distal to the base surface is about 1.25 inches. An advantage of having the inner diameter of the channel or outer diameter of the body proximate to the base surface equal to or, preferably, less than the shortest lateral dimension of the yoke to prevent thieves from attempting to insert an object through the opening 5 and in the channel 28 to pry the sheath out of position or damage the sheath. An advantage of having the outer diameter of the body of the sheath about equal to or slightly less that the width of the yoke is that such diameter increases the difficulty to sever the sheath with cable cutters or the like. The great majority of cable cutters have a cutting capacity of less than 0.5 inch, meaning that the jaws of the device simply cannot engage objects with larger diameters. To engage larger diameters, the cable cutters increase in size and require longer handles and opening angle, which make them unwieldy for a thief to use in the tight space below a vehicle and in between openings through the rim. Accordingly, a thief would likely discover by viewing the sheath, such as can be seen from the perspective in FIG. 9, that they do not have a cable cutter of the proper size to attempt to cut a sheath with a diameter 0.5 inch or greater and move on to another target.

The sheath 9 can include of an overall width, thickness, and/or outer diameter proximate to the base that prevents or makes it difficult to cut or destroy the sheath 9. For example, the width, thickness, or outer diameter proximate to the base can be greater than the jaws of a cutting device can engage. In addition, the material of the sheath 9 can be of a type that prevents or makes difficult to cut or destroy the sheath 9. Suitable materials for the sheath include hard plastic, hard metal, or combination of the same.

The sheath can be formed of a single, unitary piece or separate pieces. In one example embodiment, the sheath is formed of a first lateral side 31 and a second lateral side 32. To install such an example embodiment of the sheath, a length of exposed cable is positioned within the portion of the channel formed in either of the lateral sides and lateral sides are secured together to cover the cable with the sheath. This embodiment is particularly useful as, for example, an aftermarket part to install on the cable and yoke securement systems to prevent theft of the spare tire systems that do not already include a sheath of the current invention.

The lateral sides may be fixedly secured to each other by various securement structures and methods, including snap-on hooks 34, dovetail type joints 35, a clamp 36, and/or adhesive. Referring to FIGS. 4, 5, 5A, 5B, 10 and 11 snap-on hooks 34 can include, for example, a hook 37 and complimentary receptacle 38, the hook being sufficiently elastic to snap into the receptacle but rigid to maintain hold in the secured position. Referring to FIGS. 9, 9A, 9B, and 9C, dovetail type joints 35 can include, for example, rails 39 and complementary rail grooves 40 for slidably coupling the lateral sides. In addition, a clamp 36 can be used to secure the lateral side together or to provide reinforcement in addition to other means of securement.

Embodiments of the sheath that include separate lateral sides can provide advantages by having one lateral side structurally identical to the other. For example, FIGS. 4, 5, 5A, and 5B show that both lateral sides of the sheath can include the same overall dimensions and securement structure and join to form a complete sheath. Such an embodiment has the benefit of, for example, simplifying installation. In addition, entirely identical lateral sides have the benefit of requiring a single mold to manufacture both lateral sides.

Embodiments of the current invention include sheaths of adjustable height. Sheaths of adjustable height provide multiple advantages including being adaptable to different distances between the rim and the underside surface of an automobile attributable to, for example, the various sizes and shapes of rims, tires, and surfaces of automobile undercarriages. One example of a sheath of adjustable height includes that depicted in FIGS. 10 and 11. The sheath 9 can include an upper sheath housing 41, a lower sheath housing 42, and a compression spring 43. In the embodiment shown in FIGS. 10 and 11, the spring resists movement of the base surface 26 of the sheath 9 toward the top surface 25 of the sheath 9 by being in functional contact with the upper and lower housings. Such compressive movement can be exerted by the yoke 3 being drawn toward the underside surface 19 of the automobile by a winch system until the cable 3 is taught. In addition, in the example embodiment shown in FIGS. 10 and 11, a spring provides resistance to displacement of the lower housing away from the yoke. Such feature is advantages as to prevent a thief from attempting to raise the lower housing to gain access to the cable 4.

The adjustable height embodiments can also be configured to separate lateral sides as described above with reference to FIGS. 4, 5, 5A, 5B, 9, 9A, 9B, and 9C. The embodiment of a sheath of adjustable height depicted in FIGS. 10 and 11 includes, as an example, snap-on hooks to secure the lateral sides of the respective housings. Further, the cable 4 can be positioned within the spring 43 by, for example, fitting the cable between and end of the spring an adjacent coil and sliding the cable between the coils until cable is within all of the coils.

Figures 12, 13:
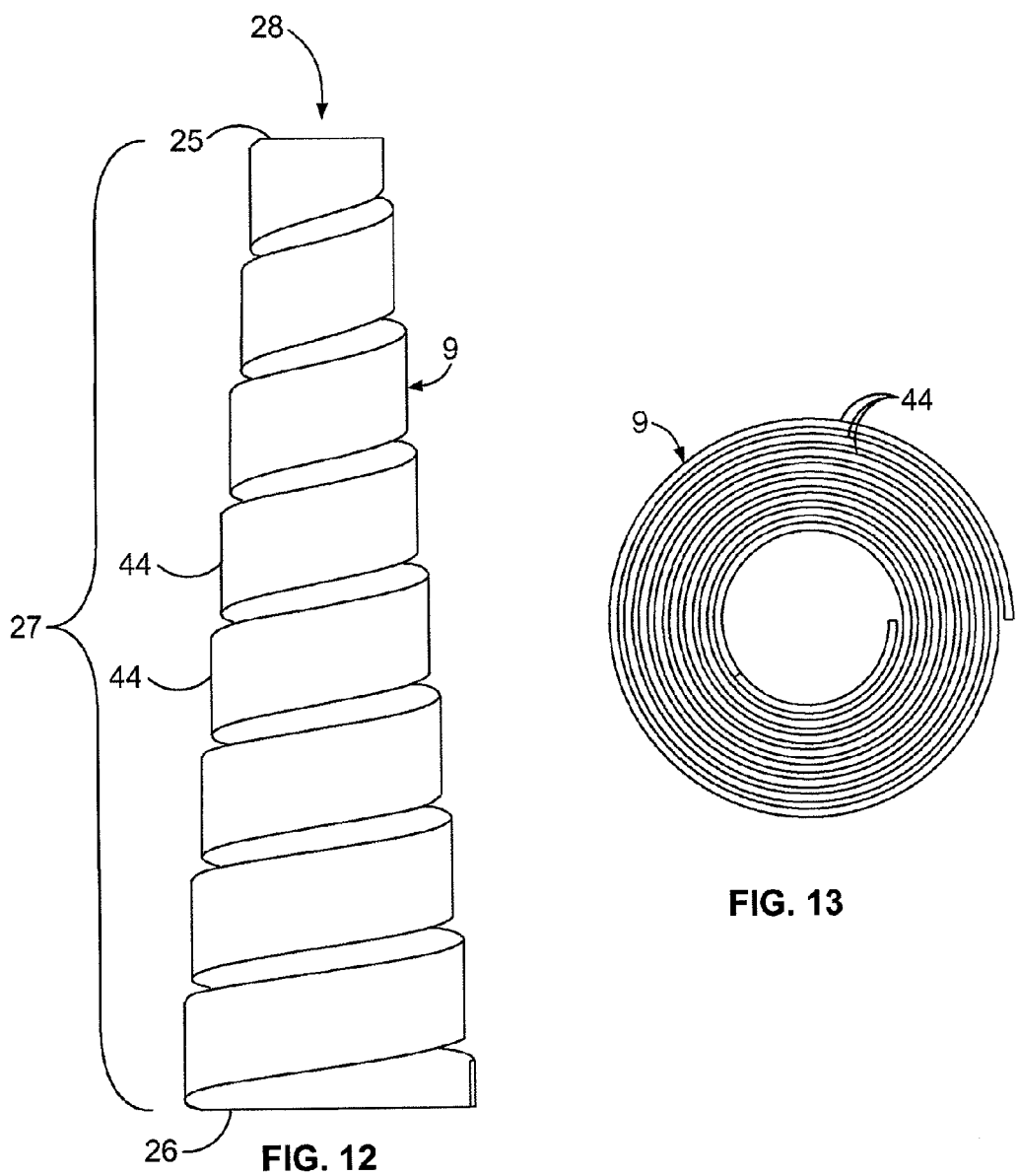
FIG. 12 depicts a side elevation view of an embodiment of the spare tire security device of the current invention.
FIG. 13 depicts a top view of an embodiment of the spare tire security device of the current invention.
Figure 14:
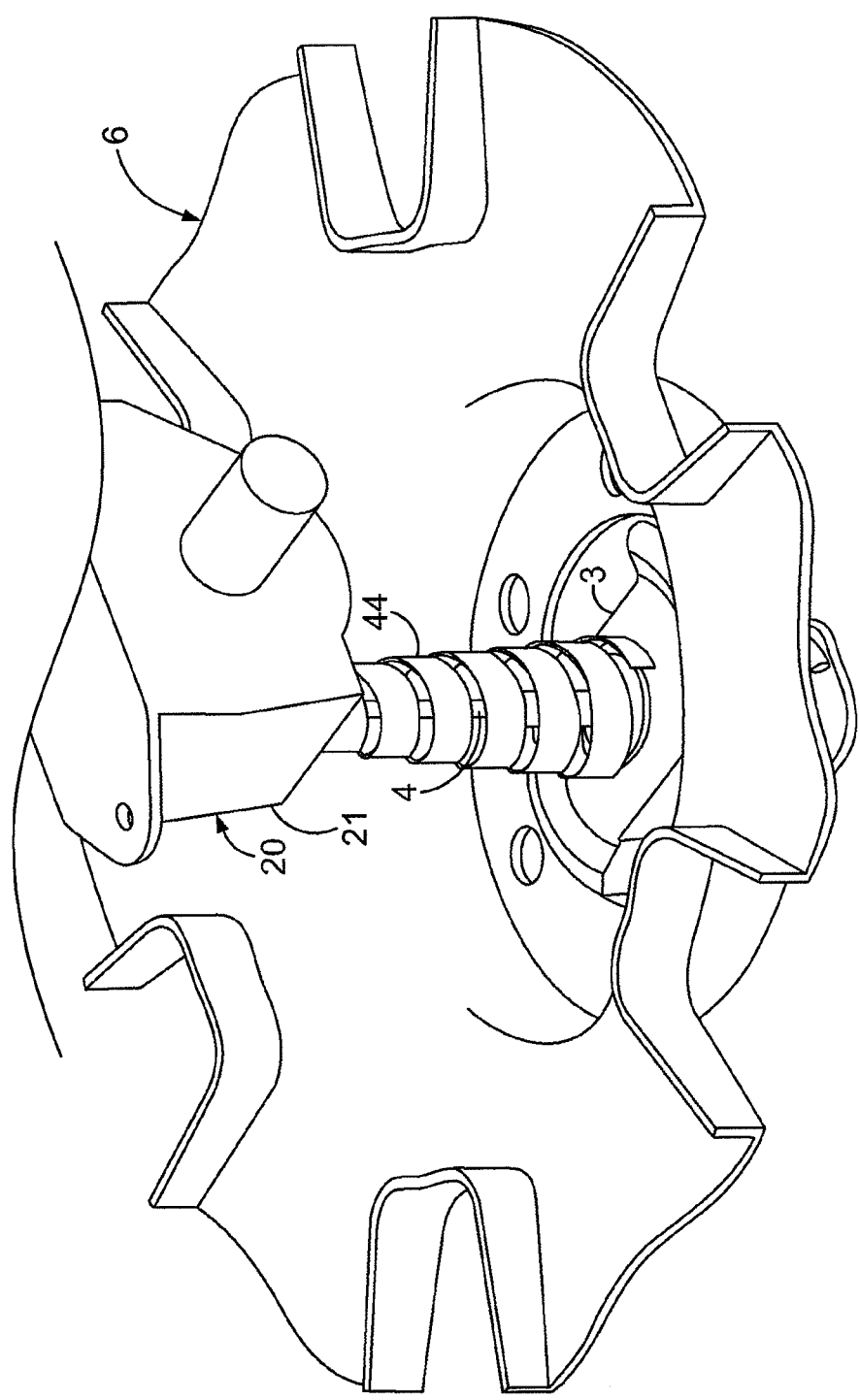
FIG. 14 depicts a top perspective view of a cable and yoke system with an embodiment of the spare tire security device of the current invention installed thereon.

Another example embodiment of a sheath of adjustable height is depicted in FIGS. 12 and 13, where the body of the sheath 9 is formed of a volute spring. Under compression, the coils slide past each other, closing the space between the coils, and thereby cover the exposed cable.

The current invention overcomes the disadvantages of the prior art and accomplishes the surprising result of effective anti-theft protection, ease of access to the tire, reliable access to the tire, in an uncomplicated and cost effective manner. The anti-theft effectiveness of the current invention exhibited by that, for example, a great majority of the cutting devices used to sever cables of cable and yoke systems are rendered useless for such purpose. The current invention provides effective anti-theft protection while providing ease of access to the spare tire. For example, once the sheath is installed the operator need not perform any additional tasks to remove the spare or replace the spare (such as remove a plate or disk from the rim) as the sheath can stay in position during removal or installation of the spare. The current invention provides effective anti-theft protection and reliable access to the spare as, for example, the sheath is unaffected by the elements. The current invention provides effective anti-theft protection in an easy to use, cost-effective manner in that, for example, the sheath can consist of one piece or several easily assemble pieces. The two-piece embodiment can be manufactured using one mold and made of low cost plastic. The combination of anti-theft effectiveness and the aforementioned advantages are surprising and, in addition, solve a long-felt need for a solution where many others have failed to achieve such combination.

The reader should understand that these specific examples are set forth merely to illustrate examples of the invention, and they should not be construed as limiting the invention.

Many variations may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. An automobile spare tire securement and security system comprising:
    a cable, the cable comprising a proximal end and a distal end, the proximal end configured to be secured to an automobile so that at least a portion of the cable extends beyond an underside surface of the automobile;
    a yoke, the yoke coupled to the distal end of the cable;
    the cable and the yoke adapted to cooperatively secure a spare tire to the underside of the automobile;
    a sheath, comprising a top surface, a base surface, and a body extending from the top surface to the base surface, the body further comprising a channel defined within the body and extending from the top surface of the sheath through the base surface of the sheath,
    wherein the sheath is positioned so that the portion of the cable which extends from beyond the underside surface of the automobile to the yoke extends within the channel of the sheath, such that the body of the sheath substantially covers the cable extending between the underside surface of the automobile and the yoke,
    wherein the top surface of the sheath is secured against the underside surface of the automobile from which the cable extends and wherein the base surface of the sheath is secured against the yoke;
    wherein the sheath is of adjustable height and wherein the body of the sheath is in the form of a volute spring such that the body resists moving the base surface of the sheath toward the top surface of the sheath; and
    wherein coils of the volute spring are adapted to slide past each other and to cover the portion of the cable extending from the underside surface to the yoke when the volute spring is under compression.

2. The system of claim 1 wherein the body of the sheath covers space proximate to lateral circumference of the cable between the underside surface of the vehicle and the yoke.

3. The system of claim 1 wherein the body of the sheath is annular and the inner diameter of the channel proximate to the base surface or the outer diameter of the body proximate to the base surface is equal to or less than the shortest lateral dimension of the yoke.

4. The system of claim 1 wherein the sheath is integral with at least one of the underside of the automobile, the yoke, and a winch housing.

5. A spare tire security device for a cable and yoke spare tire securement system comprising:
    a sheath, comprising a top surface, a base surface, and a body extending from the top surface to the base surface, the body further comprising a channel defined within the body and extending from the top surface of the sheath through the base surface of the sheath,
    wherein the sheath is adapted to cover a portion of a cable which extends from an underside surface of an automobile to a yoke secured to a distal end of the cable, and
    wherein the top surface of the sheath is adapted to be secured against the underside surface of the automobile from which the cable extends and wherein the base surface of the sheath is adapted to be secured against the yoke;
    wherein the sheath is of adjustable height and wherein the body of the sheath is in the form of a volute spring such that the body resists moving the base surface of the sheath toward the top surface of the sheath; and
    wherein coils of the volute spring are adapted to slide past each other and to cover the portion of the cable extending from the underside surface to the yoke when the volute spring is under compression.

6. The sheath of claim 5 wherein the body of the sheath is annular and the inner diameter of the channel proximate to the base surface is dimensioned to at least one of about equal to the shortest lateral dimension of the yoke, less than the shortest lateral dimension of the yoke, and to cover space proximate to the lateral circumference of the cable between the underside surface of the vehicle and the yoke.

\* \* \* \* \*